(No Model.)
F. SWAIN.
BICYCLE.
No. 311,687. Patented Feb. 3, 1885.
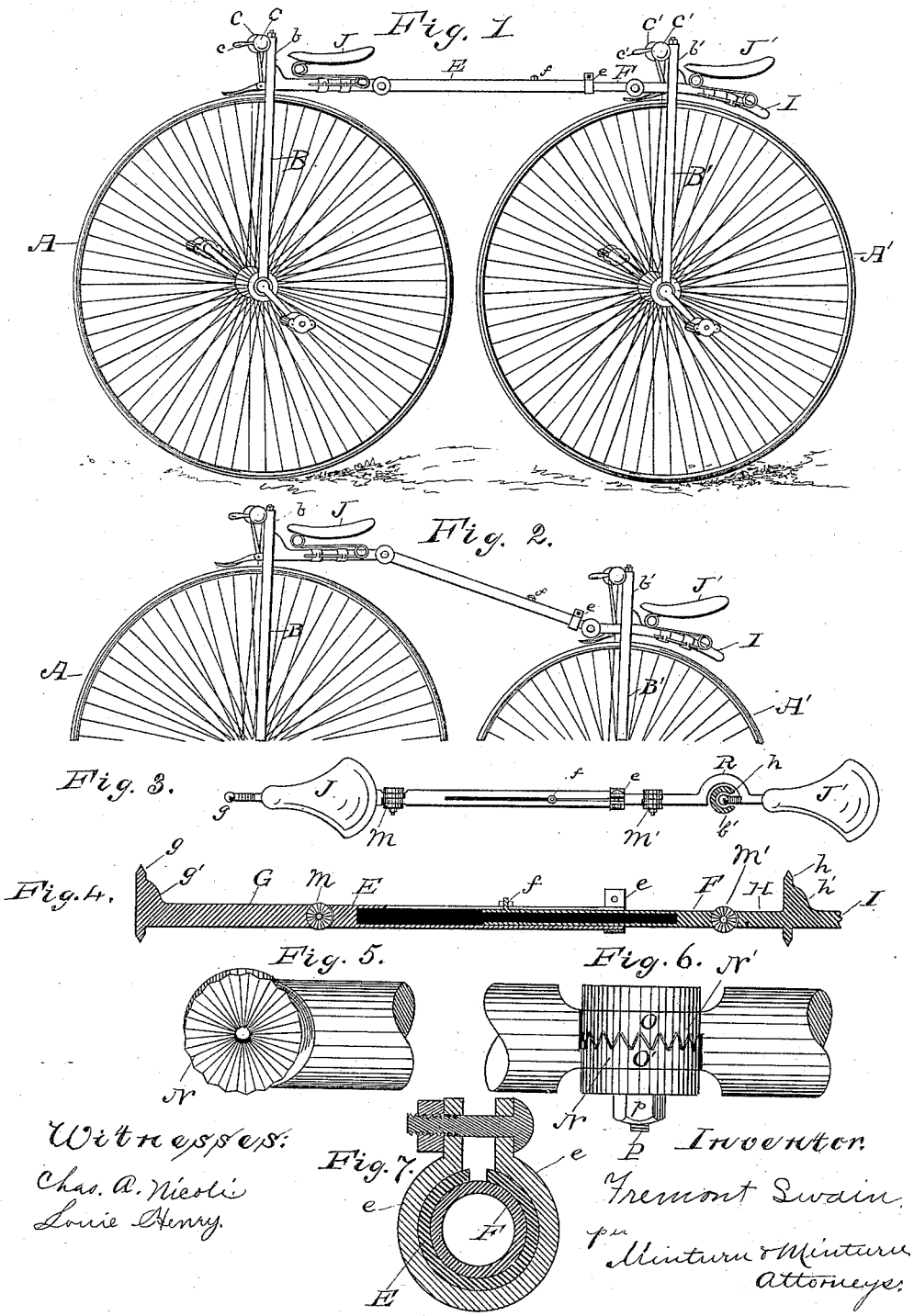

UNITED STATES PATENT OFFICE.

FREMONT SWAIN, OF INDIANAPOLIS, INDIANA.

BICYCLE.

SPECIFICATION forming part of Letters Patent No. 311,687, dated February 3, 1885.

Application filed May 12, 1884. (No model.)

*To all whom it may concern:*

Be it known that I, FREMONT SWAIN, a citizen of the United States, residing at Indianapolis, in the county of Marion and State of Indiana, have invented a new and useful Improvement in Bicycles, of which the following is a specification.

My improvement relates to that part of a bicycle commonly known as the "backbone," and to that class of bicycles having two driving-wheels and carrying two riders, and known as the "tandem" bicyle; and the object of my improvement is to provide a backbone that can be lengthened or shortened and suitably adjusted to fit the driving-wheels of any two ordinary bicycles and join them together into a tandem machine. This I accomplish by the mechanism illustrated in the accompanying drawings, in which—

Figure 1 is a side view of my entire invention, showing the position of the backbone when joining together two wheels having the same diameter. Fig. 2 is a side view of the backbone when joining two wheels of different diameters. Fig. 3 is a top view of the backbone with both wheels and their connecting mechanism removed. This view also shows my method of curving the backbone around the head on the rear wheel when the latter is of the closed-head type, or closed in front, as is commonly used. Fig. 4 is a vertical longitudinal section of the backbone. Fig. 5 is a side view of one of the heads or disks in the joint for adjusting the seats. The view shows the radially notched or serrated surface to keep the sections from turning upon each other. Fig. 6 is a top view of the joint, showing the manner in which the notches on the two contacting or inside faces of the joint-heads interlock. Fig. 7 is a vertical cross-section through the clamp by which the telescopic joint in the backbone is locked.

Similar letters refer to similar parts throughout the several views.

A is the front and A' the rear wheel. On the front wheel, B, is the fork, and b the head. The head b is provided with upper and lower bridges, between which the spindle on the front end of the backbone is centered.

C C are the handles, and c the brake, as found on the bicycle of common form. On the rear wheel the fork B', the head b', and the handles C'' C' are the same as found on the bicycles of common form. Both wheels A and A' are driving-wheels, propelled by any suitable arrangement of pedals.

So far as above described, the mechanism is old; and the novelty in my invention consists in the backbone D, by which the two wheels A and A' are connected, and which I will now more fully describe. The heads b and b' are the points at which the backbone is attached. On the front end of the backbone, and continuous therewith, is the vertical spindle g, which is pivoted between the upper and lower bridges in the head b. A center screw in the upper bridge affords a means of tightening the spindle, as in the ordinary bicycle. Near the rear end of the backbone, as shown in Figs. 3 and 4, is a second spindle, similar to the one just described. This spindle is centered between the bridges in the head b', and is tightened by means of a center screw, as described for the front spindle. The saddle J, for the front man, is fastened to the backbone immediately to the rear of the head b. The saddle for the man behind is fastened to the tail-piece I, which piece is a continuation of the backbone to a suitable distance beyond the spindle h. The seats may be of any known pattern, and may be attached by any known means. A backbone made of a single piece with the spindles, as described, will be all-sufficient for wheels of the same diameter; but if the same backbone is used on wheels whose diameters vary, it will be found too long for small wheels and too short for large ones, and if used to connect a large wheel with a small one it will lie at such an angle as to destroy the riding qualities of the attached seat and of the entire machine. The first difficulty I overcome by making a telescopic joint between the two spindles. As shown in the drawings, the middle of the backbone is formed of two concentric tubes, E and F, the outer one of which has a longitudinal slot on its upper side and a clamp, e, (shown in cross-section in Fig. 7,) on its end. The slot in the outer tube allows the sides to be drawn together by the clamp tight enough to keep the tubes from slipping apart. A nut, f, on a stud fastened to the inner tube, and projecting through the slot in the outer one, allows the end of the inner tube to be secured to prevent any play that it might have. By means of the telescopic joint it will be seen that the length of the backbone can be readily varied to suit the varying distance between the heads $b$ and $b'$ occasioned by the difference in the diameters of the wheels. In connecting a large and a small wheel the sloping position assumed by the backbone throws the attached seats so much out of place and angle that a means of adjustment is necessary. This I accomplish by the joints M and M', the joint M being placed to the rear of the front seat, and the joint M' in front of the back spindle and as close to it as possible without interfering with the wheel. The details of these joints are best shown in Figs. 5 and 6.

In Fig. 6 the head N is a continuation of the front section of the backbone, and the head N' a continuation of the rear section.

O and O' are thick metal disks or washers, between which the heads N and N' are clamped by means of the bolt and nut P $p$. The inside faces of the heads N and N' have long notches running from the rim to the center, which interlock and securely hold the heads from turning each upon the other when brought together by the bolt. These two joints M and M' allow of the proper adjustment of the saddles independently of the angle which the backbone may have.

The practical application of my invention is as follows: The curved backbones and small wheels of two bicycles of common form are removed by loosening the center screws which hold the spindles. The spindles of my improved backbone are then adjusted between the bridges in the heads of the two wheels, and the length of the backbone is properly adjusted by means of the telescopic joints, after which the proper angle is given to the seats by means of the two joints M and M'.

In some machines now in use the heads $b$ and $b'$ are open in front, and in others the front is closed, the only opening being in the rear of the head to admit the spindle. In the open head the front extension of the backbone can be passed directly through the opening in the head; but in the closed-head pattern it becomes necessary to have the backbone curved, as shown in Fig. 3, to pass to one side of the head. In this case the neck and attached spindle project forward into the center of the curve, and can be readily passed through the opening in the back of the head and the spindle placed in position between the bridges.

In adjusting the backbone on wheels having the open head the easiest plan is to draw the telescoping ends entirely apart and again unite them after passing the rear section through the open head of the rear wheel.

Having thus fully described my invention, what I claim as new, and wish to secure by Letters Patent, is—

1. A backbone for tandem bicycles that can be readily lengthened or shortened to connect driving-wheels of any diameter, substantially as described and specified.

2. A backbone for tandem bicycles having a telescopic joint for lengthening the backbone, and a suitable means for locking the joint at any desired point, as described and set forth.

3. In a backbone for tandem bicycles, a telescopic joint locked by means of a clamp at any desired point, as described and set forth.

4. In a backbone for tandem bicycles, a joint for adjusting the angle of the seats, as described and specified.

5. In a backbone for tandem bicycles, a joint for adjusting the seats, formed of two heads, one attached to and continuous with each adjacent section of the backbone, the contacting faces of said heads having notches which interlock and hold the heads from turning upon each other when brought together by a suitable bolt, substantially as described.

6. In a backbone for tandem bicycles, a separate joint for adjusting each of the two seats, as described.

7. In a backbone for transforming bicycles having heads closed in front into a tandem machine, the curve R in the backbone opposite the rear spindle to pass around the outside of the head, substantially as described and specified.

8. In a backbone for tandem bicycles, the telescopic joint for varying the length of the backbone, and the joints M and M' for adjusting the saddles, substantially as described and specified.

Signed at Indianapolis, Indiana, in the presence of two witnesses.

FREMONT SWAIN.

Attest:
CHAS. A. NICOLÉ,
LOUIE HENRY.